(12) United States Patent
Babakrpur Nalousi et al.

(10) Patent No.: US 11,139,738 B2
(45) Date of Patent: Oct. 5, 2021

(54) CURRENT LOAD BASED MODE CONTROL FOR CONVERTER CIRCUIT

(71) Applicant: SHENZHEN GOODIX TECHNOLOGY CO., LTD., Shenzhen (CN)

(72) Inventors: Esmail Babakrpur Nalousi, San Diego, CA (US); Siavash Yazdi, San Diego, CA (US); Ahmed Emira, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 150 days.

(21) Appl. No.: 16/735,678

(22) Filed: Jan. 6, 2020

(65) Prior Publication Data

US 2021/0211043 A1 Jul. 8, 2021

(51) Int. Cl.
*H02M 3/158* (2006.01)
*H02M 3/04* (2006.01)
*H02M 1/00* (2006.01)

(52) U.S. Cl.
CPC ............. *H02M 3/158* (2013.01); *H02M 3/04* (2013.01); *H02M 1/0032* (2021.05)

(58) Field of Classification Search
CPC ...... H02M 3/04; H02M 3/158; H02M 1/0032; H02M 3/156; H02M 1/0009; H02M 1/0025

See application file for complete search history.

(56) References Cited

U.S. PATENT DOCUMENTS

| | | | | |
|---|---|---|---|---|
| 7,843,186 | B2* | 11/2010 | Nishida | H02M 3/158 323/284 |
| 9,929,650 | B1* | 3/2018 | Kirchner | H02M 1/14 |
| 10,389,248 | B1* | 8/2019 | Park | H02M 1/083 |
| 10,651,736 | B1* | 5/2020 | Lazaro | H02M 1/08 |
| 2007/0063682 | A1* | 3/2007 | Dagher | H02M 3/156 323/282 |
| 2008/0180078 | A1* | 7/2008 | Hiasa | H02M 3/33507 323/282 |
| 2009/0206814 | A1* | 8/2009 | Zhang | H02M 3/33507 323/284 |

(Continued)

FOREIGN PATENT DOCUMENTS

| | | |
|---|---|---|
| CN | 101499713 A | 8/2009 |
| CN | 101888166 A | 11/2010 |

(Continued)

*Primary Examiner* — Yusef A Ahmed
(74) *Attorney, Agent, or Firm* — Kilpatrick Townsend & Stockton LLP

(57) ABSTRACT

A converter circuit is disclosed. The converter circuit includes a controller configured to operate a pull up component and a pull down component so as to deliver power to a load through an inductor. The controller is configured to operate in either of first and second operational modes based on average current delivered to the load. The converter circuit also includes a mode control circuit configured to change operational modes in response to an indication of current flowing from the inductor to the switch node, and in response to an indication that the average current delivered to the load is greater than the current threshold.

8 Claims, 4 Drawing Sheets

(56) References Cited

U.S. PATENT DOCUMENTS

| | | | |
|---|---|---|---|
| 2010/0320983 A1* | 12/2010 | Wu | H02M 3/156 323/283 |
| 2011/0006744 A1* | 1/2011 | Dearborn | H02M 3/156 323/282 |
| 2011/0018516 A1* | 1/2011 | Notman | H02M 3/1588 323/284 |
| 2011/0127981 A1* | 6/2011 | Miyamae | H02M 3/156 323/282 |
| 2013/0027009 A1* | 1/2013 | Tang | H02M 3/1584 323/271 |
| 2015/0061619 A1 | 3/2015 | Tang et al. | |
| 2015/0091544 A1* | 4/2015 | Jayaraj | H02M 3/156 323/284 |
| 2016/0261183 A1 | 9/2016 | Kelly | |
| 2016/0268896 A1* | 9/2016 | Yu | H02M 3/156 |
| 2016/0329734 A1* | 11/2016 | Lee | H02M 3/156 |
| 2017/0012529 A1* | 1/2017 | Yamada | H02M 3/158 |
| 2018/0262108 A1* | 9/2018 | Luo | H02M 3/158 |
| 2019/0081546 A1* | 3/2019 | Hsu | H02M 3/158 |
| 2019/0157975 A1* | 5/2019 | Vanin | H02M 3/158 |
| 2019/0229607 A1* | 7/2019 | Kim | H02M 1/088 |
| 2019/0238054 A1* | 8/2019 | Flaibani | H02M 3/156 |
| 2020/0127566 A1* | 4/2020 | Lazaro | H02M 1/0061 |
| 2020/0228011 A1* | 7/2020 | Wiktor | H02M 1/08 |
| 2021/0083583 A1* | 3/2021 | Becker | G05F 3/262 |

FOREIGN PATENT DOCUMENTS

| | | |
|---|---|---|
| CN | 102801317 A | 11/2012 |
| CN | 109004840 A | 12/2018 |

\* cited by examiner

CURRENT LOAD BASED MODE CONTROL FOR CONVERTER CIRCUIT

FIELD OF THE INVENTION

The present application generally pertains to converter circuits, and more particularly to converter circuits which switch between a pulse frequency modulation (PFM) operational mode and a continuous conduction mode (CCM) operational mode.

BACKGROUND OF THE INVENTION

Certain data converters operate in either a pulse frequency modulation (PFM) operational mode or a continuous conduction mode (CCM) operational mode. The PFM operational mode may be preferentially used for relatively low current load conditions, and the CCM operational mode may be preferentially used for relatively high load conditions. Techniques for determining current load conditions are needed to effectively control the operational mode.

BRIEF SUMMARY OF THE INVENTION

One inventive aspect is a converter circuit. The converter circuit includes a switch node, and a pull up component configured to cause a voltage at the switch node to be substantially equal to a voltage at a positive power supply, where turning off the pull up component causes the voltage at the switch node to decrease. The converter circuit also includes a pull down component configured to cause the voltage at the switch node to be substantially equal to a voltage at a negative power supply, where turning off the pull down component causes the voltage at the switch node to increase. The converter circuit also includes an inductor connected to the switch node, a controller configured to operate the pull up component and the pull down component so as to deliver power to a load through the inductor. The controller is configured to operate the pull up component and the pull down component in either of first and second operational modes, where the first operational mode is preferred if an average current delivered to the load is greater than a current threshold, and where the second operational mode is preferred if the average current delivered to load is less than the current threshold. The converter circuit also includes a mode control circuit configured to generate a mode control signal based in part on first and second change mode signals, where the first change mode signal causes the mode control signal to indicate that the operational mode should be changed from the first operational mode to the second operational mode, where the second change mode signal causes the mode control signal to indicate that the operational mode should be changed from the second operational mode to the first operational mode. The first change mode signal is generated in response to an indication of current flowing from the inductor to the switch node, and the second change mode signal is generated in response to an indication that the average current delivered to the load is greater than the current threshold. The controller is configured to operate the pull up component and the pull down component in either of the first and second operational modes based on the mode control signal.

Another inventive aspect is a method of operating a converter circuit. The converter circuit includes a switch node, a pull up component, a pull down component, an inductor connected to the switch node, a controller, and a mode control circuit. The method includes, with the pull up component, causing a voltage at the switch node to be substantially equal to a voltage at a positive power supply, where turning off the pull up component causes the voltage at the switch node to decrease. The method also includes, with the pull down component, causing the voltage at the switch node to be substantially equal to a voltage at a negative power supply, where turning off the pull down component causes the voltage at the switch node to increase. The method also includes, with the controller, operating the pull up component and the pull down component in either of first and second operational modes so as to deliver power to a load through the inductor, where the first operational mode is preferred if an average current delivered to the load is greater than a current threshold, and where the second operational mode is preferred if the average current delivered to the load is less than the current threshold. The method also includes, with the mode control circuit, generating a mode control signal based in part on a first and second change mode signals, where the first change mode signal causes the mode control signal to indicate that the operational mode should be changed from the first operational mode to the second operational mode, where the second change mode signal causes the mode control signal to indicate that the operational mode should be changed from the second operational mode to the first operational mode, where the first change mode signal is generated in response to an indication of current flowing from the inductor to the switch node, and where the second change mode signal is generated in response to an indication that the average current delivered to the load is greater than the current threshold. The method also includes, with the controller, operating the pull up component and the pull down component in either of the first and second operational modes based on the mode control signal.

BRIEF DESCRIPTION OF THE DRAWINGS

FIG. 3 is a schematic plot indicating time periods during which the pull up component of the converter circuit of FIG. 1 is off, and during which the pull down component of the converter circuit of FIG. 1 is on.

FIG. 7 is a schematic plot indicating time periods during which the pull up component of the converter circuit of FIG. 1 is off, and during which the pull down component of the converter circuit of FIG. 1 is on.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1:
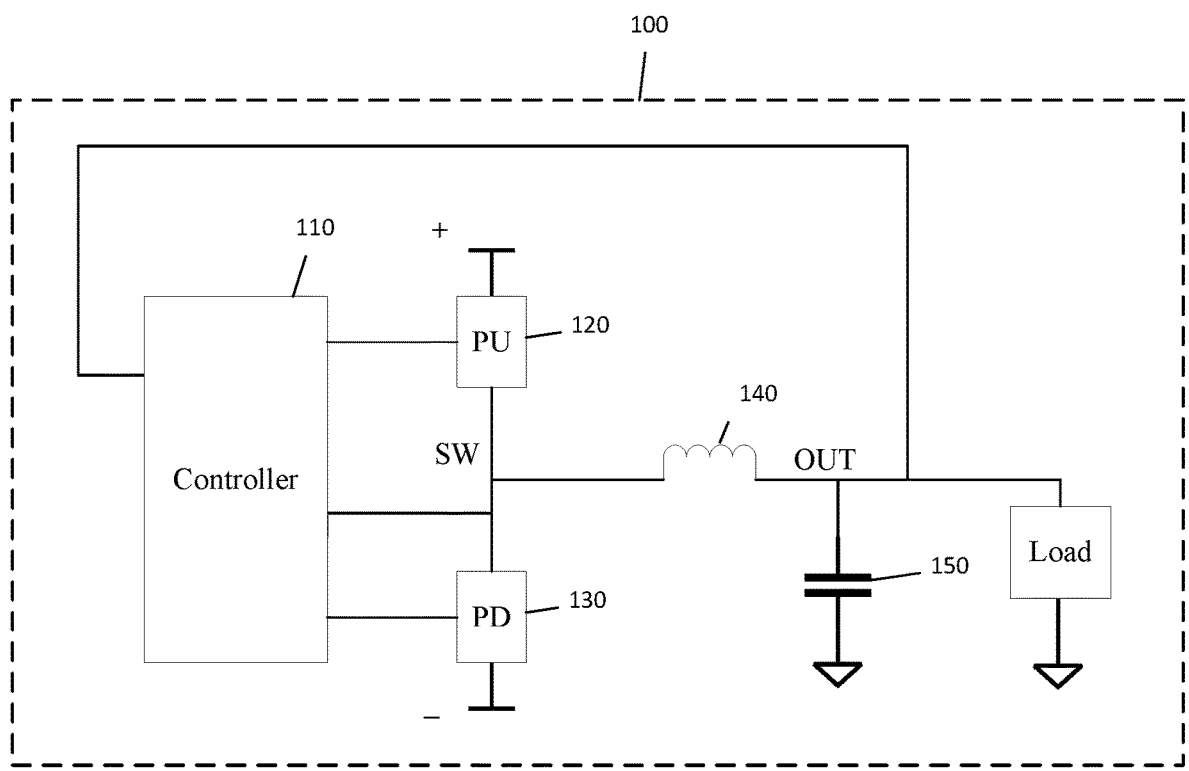
FIG. 1 is a schematic diagram of a converter circuit configured to operate in either a pulse frequency modulation (PFM) operational mode or a continuous conduction mode (CCM).

FIG. 1 is a schematic diagram of a converter circuit 100 configured to operate in either a pulse frequency modulation (PFM) operational mode or a continuous conduction mode (CCM). The illustrated circuit is an example only. The principles and aspects discussed herein may be applied to other convert circuits, as understood by those of skill in the art.

Converter circuit 100 includes controller 110, pull up component 120, pull down component 130, inductor 140, and capacitor 150.

Converter circuit 100 generates a substantially DC voltage at output node OUT by controlling the switching operations of pull up component 120 and pull down component 130. As understood by those of skill in the art, pull up component 120 causes the voltage at node SW to be substantially equal to the voltage at the positive power supply, and turning off pull up component 120 causes the voltage at node SW to decrease because of the continuous current in inductor 140. Similarly, pull down component 130 causes the voltage at node SW to be substantially equal to the voltage at the negative power supply, and turning off pull down component 130 causes the voltage at node SW to increase because of the continuous current in inductor 140.

While operating in PFM mode, during each cycling period, the controller 110 causes the voltage at node SW to be substantially or about equal to the voltage of the positive power supply for a first duration T1 and to be substantially or about equal the voltage of the negative power supply for a second duration T2. During a third duration T3, the voltage at node SW is not caused to be substantially or about equal to the voltage of the positive power supply or to the voltage of the negative power supply. The first and second durations T1 and T2 have substantially fixed lengths, and converter circuit 100 influences the voltage at output node OUT by controlling and adjusting the third duration T3. For example, in response to an indication that the voltage at output node OUT is too low, controller 110 may decrease the third duration T3. Likewise, in response to an indication that the voltage at output node OUT is too high, controller 110 may increase the third duration T3. The frequency associated with the cycling period is therefore adjusted to cause the target voltage value at the output node OUT.

As understood by those of skill in the art, in PFM mode, the frequency associated with the cycling period is influenced by the load current. For example, increased load current results in increased current demand from the output node OUT. The increased demand is met by reducing the third duration T3, and consequently, the frequency of the cycling period increases. Likewise, decreased load current results in decrease current demand from the output node OUT. The reduced demand is met by increasing the third duration T3, and consequently, the frequency of the cycling period decreases.

While operating in CCM mode, during each cycling period, the controller 110 causes the voltage at node SW to be substantially or about equal to the voltage of the positive power supply for a first duration T1 and to be substantially or about equal the voltage of the negative power supply for a second duration T2. The sum of the first duration T1 and the second duration T2 is fixed. Converter circuit 100 influences the voltage at output node OUT by controlling and adjusting the first and second durations T1 and T2, without changing the sum of the first and second durations T1 and T2. For example, in response to an indication that the voltage at output node OUT is too low, controller 110 increases the first duration T1 and decreases the second duration T2. Likewise, in response to an indication that the voltage at output node OUT is too high, controller 110 decreases the first duration T1 and increases the second duration T2. Accordingly, the frequency associated with the cycling period during CCM operation is fixed, and the duty cycle is adjusted to cause the target voltage value at the output node OUT.

As understood by those of skill in the art, in CCM mode, the frequency associated with the cycling period is influenced by the load current. For example, increased load current results in increased current demand from the output node OUT. The increased demand is met by increasing the first duration T1, and consequently, the peak inductor current increases. Likewise, decreased load current results in decrease current demand from the output node OUT. The reduced demand is met by decreasing the first duration T1, and consequently, the peak inductor current decreases.

To optimize efficiency of the converter across a wide range of loads, the PFM operational mode may be preferentially used for relatively low current load conditions, and the CCM operational mode may be preferentially used for relatively high load conditions. Accordingly, a measurement of load current can be used to determine which mode the converter circuit 100 is to be operated in.

Load current, however, may be difficult or impractical to determine. Instead, average inductor current may be used as a proxy for load current. And, as shown below, other circuit signals may be used as an indication of average inductor current.

For example, while operating in PFM mode, the duration of T3, during which the voltage at node SW is not caused to be equal to the voltage of the positive power supply or the voltage of the negative power supply, may be used as a proxy for load current to determine conditions for causing the converter circuit 100 to switch from PFM mode to CCM mode.

In addition, while operating in CCM mode, negative inductor current (current flowing from capacitor 150 to node SW through inductor 140) may be used as a proxy for load current to determine conditions for causing the converter circuit 100 to switch from CCM mode to PFM mode.

FIGS. 2-5 are schematic plots which are referenced to establish that the other circuit signals may be used as an indication of average inductor current. In this example, the converter 100 is operating in PFM mode.

Figure 2:
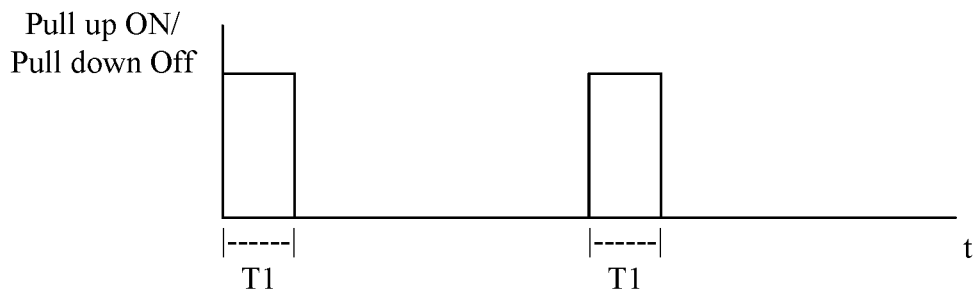
FIG. 2 is a schematic plot indicating time periods during which the pull up component of the converter circuit of FIG. 1 is on, and during which the pull down component of the converter circuit of FIG. 1 is off.

FIG. 2 is a schematic plot indicating time periods T1 during which pull up component 120 is on, and during which pull down component 130 is off.

Figure 3:
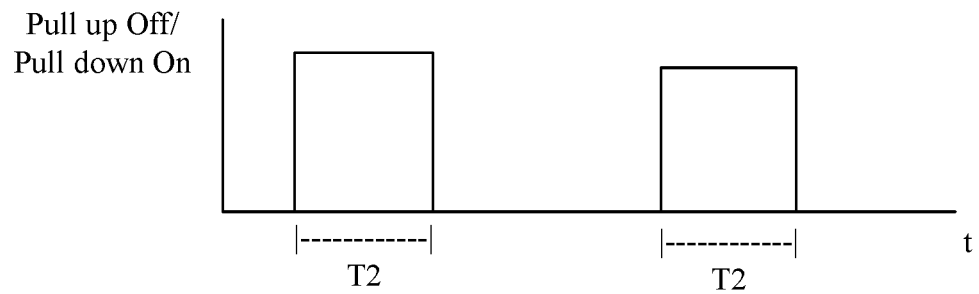

FIG. 3 is a schematic plot indicating time periods T2 during which pull up component 120 is off, and during which pull down component 130 is on.

Figure 4:
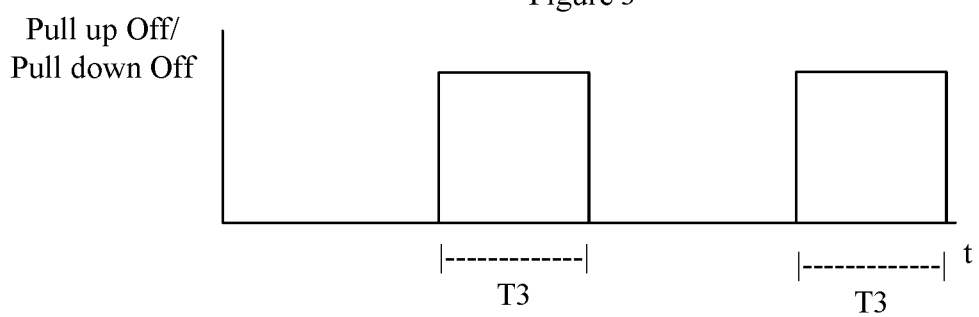
FIG. 4 is a schematic plot indicating time periods during which the pull up component of the converter circuit of FIG. 1 is off, and during which the pull down component of the converter circuit of FIG. 1 is off.

FIG. 4 is a schematic plot indicating time periods T3 during which pull up component 120 is off, and during which pull down component 130 is off.

Figure 5:
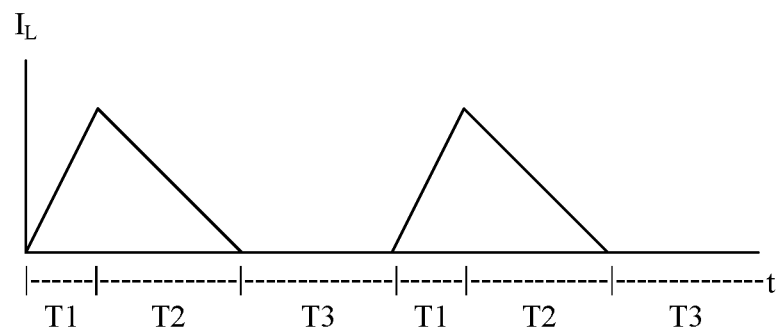
FIG. 5 is a schematic plot of the current of the inductor of the converter circuit of FIG. 1.

FIG. 5 is a schematic plot of the current of inductor 140, as derived based on the various time periods indicated in FIGS. 2, 3, and 4.

During the time periods T1 indicated in FIG. 2, during which pull up component 120 is on and pull down component 130 is off, the voltage at node SW is substantially or about equal to the voltage at the positive power supply. Because the voltage at the output node OUT may be considered DC, the current of inductor 140 increases substantially or about linearly from a minimum value or zero to a peak value Ipeak.

During the time periods T2 indicated in FIG. 3, during which pull up component 120 is off and pull down component 130 is on, the voltage at node SW is substantially or about equal to the voltage at the negative power supply. Because the voltage at the output node OUT may be considered DC, the current of inductor 140 decreases substantially or about linearly from the peak value Ipeak to a minimum value or zero.

During the time periods T3 indicated in FIG. 4, during which pull up component 120 is off and pull down component 130 is off, the voltage at node SW is substantially or about equal to the voltage at the output node OUT. Therefore, the current of inductor 140 is a minimum value or zero.

Because the converter circuit 100 is operating in PFM mode, the duration of the time periods T3 indicated in FIG. 4, during which pull up component 120 is off and pull down component 130 is off, may be used as an indication of load current to cause the converter circuit 100 to switch from PFM mode to CCM mode. Techniques for using the duration of these time periods T3 as an indication of load current to cause converter circuit 100 to switch from PFM mode to CCM mode are discussed below.

Figure 6:
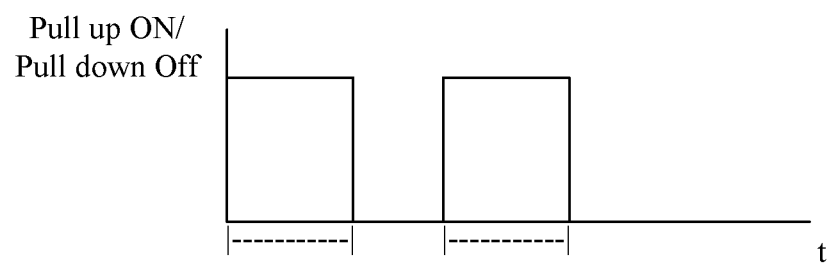
FIG. 6 is a schematic plot indicating time periods during which the pull up component of the converter circuit of FIG. 1 is on, and during which the pull down component of the converter circuit of FIG. 1 is off.
Figure 7:
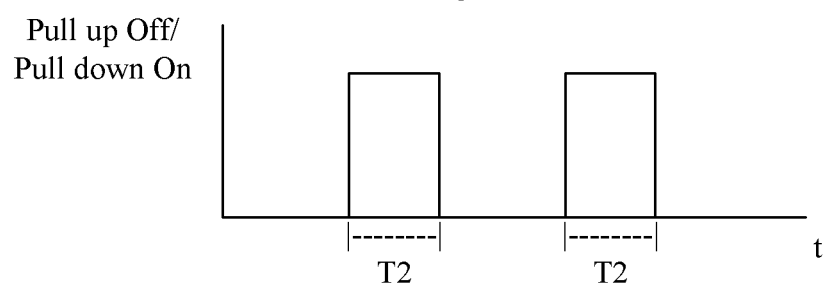
Figure 8:
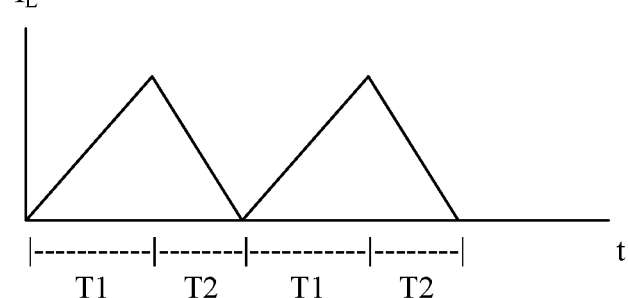
FIG. 8 is a schematic plot of the current of the inductor of the converter circuit of FIG. 1.

FIGS. 6-8 are schematic plots which are referenced to establish that the other circuit signals may be used as an indication of average inductor current. In this example, the converter 100 is operating in CCM mode.

FIG. 6 is a schematic plot indicating time periods T1 during which pull up component 120 is on, and during which pull down component 130 is off.

FIG. 7 is a schematic plot indicating time periods T2 during which pull up component 120 is off, and during which pull down component 130 is on.

FIG. 8 is a schematic plot of the current of inductor 140, as derived based on the various time periods T1 and T2 indicated in FIGS. 6 and 7.

During the time periods T1 indicated in FIG. 6, during which pull up component 120 is on and pull down component 130 is off, the voltage at node SW is substantially or about equal to the voltage at the positive power supply. Because the voltage at the output node OUT may be considered DC, the current of inductor 140 increases substantially or about linearly from a minimum value or zero to a peak value Ipeak.

During the time periods T2 indicated in FIG. 7, during which pull up component 120 is off and pull down component 130 is on, the voltage at node SW is substantially or about equal to the voltage at the negative power supply. Because the voltage at the output node OUT may be considered DC, the current of inductor 140 decreases substantially or about linearly from the peak value Ipeak to a minimum value or zero.

While operating in CCM mode, negative inductor current may be used as an indication for load current to cause the converter circuit 100 to switch from CCM mode to PFM mode. Techniques for detecting the negative inductor current and for using the detected negative inductor current as an indication of load current to cause converter circuit 100 to switch from PFM mode to CCM mode are discussed below.

Figure 9:
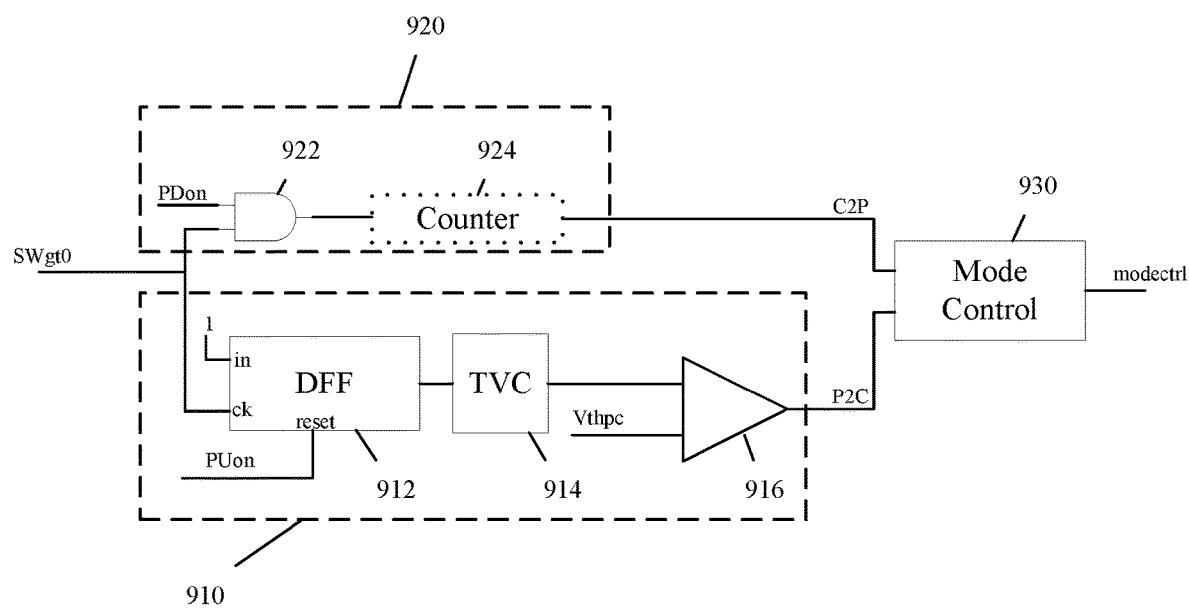
FIG. 9 is a schematic diagram of an embodiment of a mode control circuit configured to control the operational mode of converter circuit of FIG. 1 according to inductor current.

FIG. 9 is a schematic diagram of an embodiment of a mode control circuit 900 configured to control the operational mode of converter circuit 100 of FIG. 1. Mode control circuit 900 may be implemented, for example, as part of the controller 110.

Mode control circuit 900 includes control signal path 910, control signal path 920, and mode control signal generator 930.

Mode control signal generator 930 is configured to generate a mode control signal for controller 110 based on signals received from each of control signal path 910 and control signal path 920.

Control signal path 910 is configured to generate a signal at node P2C indicating that converter circuit 100 is operating with a current load high enough that the operational mode of converter circuit 100 should be changed from PFM mode to CCM mode. Control signal path 910 uses the duration of the time that the voltage at node SW is not caused to be equal to the voltage of the positive power supply or the voltage of the negative power supply (the time durations of FIG. 4) being less than a threshold as an indication that the current load is high enough that the operational mode of converter circuit 100 should be changed from PFM mode to CCM mode. Mode control circuit 900 may be implemented with alternative embodiments of control signal path 910, having input/output functionality similar or identical to that of the embodiment discussed herein.

Control signal path 920 is configured to generate a signal at node C2P indicating that converter circuit 100 is operating with a current load low enough that the operational mode of converter circuit 100 should be changed from CCM to PFM mode. Control signal path 920 uses negative inductor current as an indication that the current load is low enough that the operational mode of converter circuit 100 should be changed from CCM to PFM mode. Mode control circuit 900 may be implemented with alternative embodiments of control signal path 920, having input/output functionality similar or identical to that of the embodiment discussed herein.

Mode control signal generator 930 is configured to receive the signals at nodes P2C and C2P and generate the mode control signal for controller 110 at node modectrl. Controller 110 is configured to receive mode control signal from mode control signal generator 930 and to cause the converter circuit 100 to operate in the operational mode indicated by the mode control signal.

Each of control signal paths 910 and 920 respectively generate the signals at nodes P2C and C2P based in part on an input signal at node SWgt0, which is generated elsewhere. The input signal at node SWgt0 indicates that the voltage at node SW is equal to or greater than the voltage at the negative power supply of converter circuit 100. In some embodiments, the signal at node SWgt0 is generated by circuitry which is used to cause pull down component 130 to become conductive when the voltage at node SW is less than the voltage of the negative power supply, or to prevent pull down component 130 from becoming conductive unless the voltage at node SW is less than the voltage of the negative power supply, for example, as part of a ZCS (zero current switching) control scheme.

Control signal path 910 is configured to generate the signal at node P2C based on the input signal at node SWgt0 and additionally based on an input signal at node PUon indicating that pull up component 120 is conductive. The signal at node PUon may be generated, for example, by controller 110 by circuitry which is used to control the conductivity state of pull up component 120. Control signal path 910 uses the input signals at nodes SWgt0 and PUon as an indication of the duration of the time that the voltage at node SW is not caused to be equal to the voltage of the positive power supply or to the voltage of the negative power supply (the time durations of FIG. 4). In addition, control signal path 910 uses this duration being less than a threshold as an indication that the current load is high enough that the operational mode of converter circuit 100 should be changed from PFM mode to CCM mode.

In this embodiment, in response to the input signal at SWgt0 going high, indicating that the voltage at node SW is greater than the voltage at the negative power supply, D Flip-Flop 912 causes its output signal to go high. In addition, in response to the input signal at node PUon going high, indicating that the pull up component 120 is conductive, D Flip-Flop 912 causes its output signal to go low. Accordingly, the duration of the output of D Flip-Flop 912 being high is an indication of the duration of the time periods T3 indicated in FIG. 4, during which both pull up component 120 and pull down component 130 are off. As discussed above, the duration of the time when both pull up component 120 and pull down component 130 are off may be used as an indication of load current to cause the converter circuit 100 to switch from PFM mode to CCM mode.

TVC (time to voltage converter) circuit 914 receives the output of D Flip-Flop 912, and generates an analog voltage based on the duration of the high time of the output of D Flip-Flop 912. Any time to voltage converter circuit may be used as TVC circuit 914, as understood by those of skill in the art. For example, TVC circuit 914 may include a current source which sources current while the input to the TVC circuit input is high. While sourcing current, the current source charges a capacitor which is discharged in response to the input to the TVC circuit becoming low. In such a circuit, the voltage across the capacitor may be used as an indication of the duration of the high time.

Comparator circuit 916 compares the analog voltage generated by TVC circuit 914 with a threshold voltage at node Vthpc. In this embodiment, in response to the analog voltage generated by TVC circuit 914 being a less than the threshold voltage at node Vthpc, comparator circuit 916 generates the signal at node P2C causing the converter circuit 100 to switch from PFM mode to CCM mode in response to a change in the mode control signal at node modectrl. The threshold voltage at node Vthpc is generated so as to correspond with the analog voltage generated by TVC circuit 914 in response to the time periods T3 being long enough that the converter circuit 100 should switch from PFM mode to CCM mode. In some embodiments, the threshold voltage at node Vthpc may be generated based on a nominal peak inductor current in PFM mode.

Accordingly, in response to the converter circuit 100 operating with a current load high enough that the operational mode of converter circuit 100 should be changed from PFM mode to CCM mode, the controller 110 reduces the duration of the time that the voltage at node SW is not caused to be equal to the voltage of the positive power supply or the voltage of the negative power supply. In addition, the reduction in that duration causes the control signal path 910 to generate the signal at node P2C indicating that the operational mode of converter circuit 100 should be changed from PFM mode to CCM mode.

Control signal path 920 is configured to generate the signal at node C2P based on the input signal at node SWgt0 and additionally based on an input signal at node PDon indicating that pull down component 130 is conductive. The signal at node PDon may be generated, for example, by controller 110 with circuitry which is used to control the conductivity state of pull down component 130. Control signal path 920 uses the simultaneous occurrence of the voltage at node SW being greater than the negative power supply of converter 100 and the pull down component 130 being conductive as an indication of negative inductor current. In addition, control signal path 920 uses the negative inductor current as an indication that the current load is low enough that the operational mode of converter circuit 100 should be changed from CCM to PFM mode.

In this embodiment, in response to the input signal at SWgt0 being high, indicating that the voltage at node SW is greater than the voltage at the negative power supply, and the signal at node PDon being high, indicating that pull down component 130 is conductive, the output of AND logic gate 922 goes high.

In some embodiments, the output of AND logic gate 922 going high may be used as the signal at node C2P indicating that the operational mode of converter circuit 100 should be changed from PFM CCM to PFM mode.

In alternative embodiments, an optional counter 924 counts consecutive occurrences of the output of AND logic gate 922 going high, and in response to optional counter 924 counting a predetermined number of such occurrences, optional counter 924 generates the signal at node C2P which causes the operational mode of converter circuit 100 to be changed from CCM mode to PFM mode in response to a change in the mode control signal at node modectrl.

The optional counter 924 may be reset by the occurrence of the input signal at SWgt0 being low when the signal at node PDon goes low, for example, as determined with a D Flip-Flop, as understood by those of skill in the art.

Accordingly, in response to the converter circuit 100 operating with a current load low enough that the operational mode of converter circuit 100 should be changed from CCM mode to PFM mode, the converter circuit 110 will operate such that the voltage at node SW is greater than the voltage at the negative power supply while the pull down component 130 is conductive. In addition, that condition will repeat a predetermined number of times, causing the control signal path 920 to generate the signal at node C2P indicating that the operational mode of converter circuit 100 should be changed from PFM mode to CCM mode.

As understood by those of ordinary skill in the art, complementary switching devices, such as pull up component 120 and pull down component 130 of FIG. 1, and such as switches Ton and Toff of FIG. 6 may be operated so as to prevent both of the complementary switching devices on simultaneously. For the discussions herein, the brief period of time between one of the complementary switching devices turning off and the other of the complementary switching devices turning on (the dead time) is considered to be in either of the adjacent time periods, as understood by one of ordinary skill in the art.

Though the present invention is disclosed by way of specific embodiments as described above, those embodiments are not intended to limit the present invention. Based on the methods and the technical aspects disclosed herein, variations and changes may be made to the presented embodiments by those of skill in the art without departing from the spirit and the scope of the present invention.

What is claimed is:

1. A converter circuit, comprising:
 a switch node;
 a pull up component configured to cause a voltage at the switch node to be substantially equal to a voltage at a positive power supply, wherein turning off the pull up component causes the voltage at the switch node to decrease;
 a pull down component configured to cause the voltage at the switch node to be substantially equal to a voltage at a negative power supply, wherein turning off the pull down component causes the voltage at the switch node to increase;
 an inductor connected to the switch node;
 a controller configured to operate the pull up component and the pull down component so as to deliver power to a load through the inductor, where the controller is configured to operate the pull up component and the pull down component in either of first and second operational modes, wherein the first operational mode is selected in response to an average current delivered to the load being greater than a current threshold, and wherein the second operational mode is in response to the average current delivered to load being less than the current threshold; and
 a mode control circuit configured to generate a mode control signal based in part on first and second change mode signals, wherein the first change mode signal causes the mode control signal to indicate that the operational mode should be changed from the first operational mode to the second operational mode, wherein the second change mode signal causes the mode control signal to indicate that the operational mode should be changed from the second operational mode to the first operational mode, wherein the first change mode signal is generated in response to an indication of current flowing from the inductor to the switch node, and wherein the second change mode signal is generated in response to an indication that the average current delivered to the load is greater than the current threshold,
 wherein the controller is configured to operate the pull up component and the pull down component in either of the first and second operational modes based on the mode control signal,
 wherein the mode control circuit comprises a first change mode signal generator configured to generate the first change mode signal, wherein the first change mode signal generator is configured to generate the first change mode signal in response to the voltage at the switch node being greater than the voltage at the negative power supply while the pull down component is conductive,
 wherein the first change mode signal generator is configured to generate the first change mode signal in response to a predetermined number of consecutive occurrences of the voltage at the switch node being greater than the voltage at the negative power supply while the pull down component is conductive, and
 wherein the first change mode signal generator comprises a counter to indicate that the predetermined number of consecutive occurrences have occurred, wherein the counter is configured to be reset by an occurrence of the voltage at the switch node being less than the voltage at the negative power supply when the pull down component is turned off.

2. The converter circuit of claim 1, wherein the first operational mode is a continuous conduction mode.

3. The converter circuit of claim 1, wherein the second operational mode is a pulse frequency modulation mode.

4. A converter circuit, comprising:
 a switch node;
 a pull up component configured to cause a voltage at the switch node to be substantially equal to a voltage at a positive power supply, wherein turning off the pull up component causes the voltage at the switch node to decrease;
 a pull down component configured to cause the voltage at the switch node to be substantially equal to a voltage at a negative power supply, wherein turning off the pull down component causes the voltage at the switch node to increase;
 an inductor connected to the switch node;
 a controller configured to operate the pull up component and the pull down component so as to deliver power to a load through the inductor, where the controller is configured to operate the pull up component and the pull down component in either of first and second operational modes, wherein the first operational mode is selected in response to an average current delivered to the load being greater than a current threshold, and wherein the second operational mode is selected in response to the average current delivered to load being less than the current threshold; and
 a mode control circuit configured to generate a mode control signal based in part on first and second change mode signals, wherein the first change mode signal causes the mode control signal to indicate that the operational mode should be changed from the first operational mode to the second operational mode, wherein the second change mode signal causes the mode control signal to indicate that the operational mode should be changed from the second operational mode to the first operational mode, wherein the first change mode signal is generated in response to an indication of current flowing from the inductor to the switch node, and wherein the second change mode signal is generated in response to an indication that the average current delivered to the load is greater than the current threshold,
 wherein the controller is configured to operate the pull up component and the pull down component in either of the first and second operational modes based on the mode control signal,
 wherein the mode control circuit comprises a second change mode signal generator configured to generate the second change mode signal, wherein the second change mode signal generator is configured to generate the second change mode signal in response to the voltage at the switch node being greater than the voltage at the negative power supply while the pull down component is nonconductive for a duration less than a time threshold,
 wherein the second change mode signal generator comprises a condition signal generator configured to generate a condition signal which is active while a condition is met, where the condition includes that the duration of the voltage at the switch node is greater than the voltage at the negative power supply while the pull down component is nonconductive, wherein the second change mode signal generator comprises a duration signal generator configured to generate a duration signal corresponding with the duration of the condition signal, and wherein the second change mode signal generator comprises a change signal generator configured to generate the second change mode signal in response to the duration signal indicating that the duration of the voltage at the switch node being greater than the voltage at the negative power supply while the pull down component is nonconductive is less than the time threshold.

5. A method of operating a converter circuit, the converter circuit comprising:
   a switch node;
   a pull up component;
   a pull down component;
   an inductor connected to the switch node;
   a controller; and
   a mode control circuit,
   the method comprising:
   with the pull up component, causing a voltage at the switch node to be substantially equal to a voltage at a positive power supply, wherein turning off the pull up component causes the voltage at the switch node to decrease;
   with the pull down component, causing the voltage at the switch node to be substantially equal to a voltage at a negative power supply, wherein turning off the pull down component causes the voltage at the switch node to increase;
   with the controller, operating the pull up component and the pull down component in either of first and second operational modes so as to deliver power to a load through the inductor, wherein the first operational mode is selected in response to if an average current delivered to the load being greater than a current threshold, and wherein the second operational mode is selected in response to if the average current delivered to the load being less than the current threshold;
   with the mode control circuit, generating a mode control signal based in part on a first and second change mode signals, wherein the first change mode signal causes the mode control signal to indicate that the operational mode should be changed from the first operational mode to the second operational mode, wherein the second change mode signal causes the mode control signal to indicate that the operational mode should be changed from the second operational mode to the first operational mode, wherein the first change mode signal is generated in response to an indication of current flowing from the inductor to the switch node, and wherein the second change mode signal is generated in response to an indication that the average current delivered to the load is greater than the current threshold;
   with the controller, operating the pull up component and the pull down component in either of the first and second operational modes based on the mode control signal,
   wherein the mode control circuit comprises a first change mode signal generator;
   with the first change mode signal generator, generating the first change mode signal in response to the voltage at the switch node being greater than the voltage at the negative power supply while the pull down component is conductive;
   with the first change mode signal generator, generating the first change mode signal in response to a predetermined number of consecutive occurrences of the voltage at the switch node being greater than the voltage at the negative power supply while the pull down component is conductive,
   wherein the first change mode signal generator comprises a counter;
   with the counter, indicating that the predetermined number of consecutive occurrences have occurred; and
   resetting the counter in response to an occurrence of the voltage at the switch node being less than the voltage at the negative power supply when the pull down component is turned off.

6. The method of claim 5, wherein the first operational mode is a continuous conduction mode.

7. The method of claim 5, wherein the second operational mode is a pulse frequency modulation mode.

8. A method of operating a converter circuit, the converter circuit comprising:
   a switch node;
   a pull up component;
   a pull down component;
   an inductor connected to the switch node;
   a controller; and
   a mode control circuit,
   the method comprising:
   with the pull up component, causing a voltage at the switch node to be substantially equal to a voltage at a positive power supply, wherein turning off the pull up component causes the voltage at the switch node to decrease;
   with the pull down component, causing the voltage at the switch node to be substantially equal to a voltage at a negative power supply, wherein turning off the pull down component causes the voltage at the switch node to increase;
   with the controller, operating the pull up component and the pull down component in either of first and second operational modes so as to deliver power to a load through the inductor, wherein the first operational mode is selected in response to an average current delivered to the load being is greater than a current threshold, and wherein the second operational mode is selected in response to the average current delivered to the load being is less than the current threshold;
   with the mode control circuit, generating a mode control signal based in part on a first and second change mode signals, wherein the first change mode signal causes the mode control signal to indicate that the operational mode should be changed from the first operational mode to the second operational mode, wherein the second change mode signal causes the mode control signal to indicate that the operational mode should be changed from the second operational mode to the first operational mode, wherein the first change mode signal is generated in response to an indication of current flowing from the inductor to the switch node, and wherein the second change mode signal is generated in response to an indication that the average current delivered to the load is greater than the current threshold;
   with the controller, operating the pull up component and the pull down component in either of the first and second operational modes based on the mode control signal, wherein the mode control circuit comprises a second change mode signal generator;

with the second change mode signal generator, generating the second change mode signal in response to the voltage at the switch node being greater than the voltage at the negative power supply while the pull down component is nonconductive for a duration less than a time threshold, wherein the second change mode signal generator comprises a condition signal generator;

with the condition signal generator, generating a condition signal which is active while a condition is met, where the condition includes that the duration of the voltage at the switch node is greater than the voltage at the negative power supply while the pull down component is nonconductive, wherein the second change mode signal generator comprises a duration signal generator;

with the duration signal generator, generating a duration signal corresponding with the duration of the condition signal, wherein the second change mode signal generator comprises a change signal generator; and with the change signal generator, generating the second change mode signal in response to the duration signal indicating that the duration of the voltage at the switch node being greater than the voltage at the negative power supply while the pull down component is nonconductive is less than the time threshold.

* * * * *